(12) United States Patent
McCall et al.

(10) Patent No.: US 8,688,378 B2
(45) Date of Patent: Apr. 1, 2014

(54) RIDE-SHARE SERVICE

(75) Inventors: Clark E. McCall, Ann Arbor, MI (US); Walter M. Lazar, II, Howell, MI (US)

(73) Assignee: GM Global Technology Operations LLC, Detriot, MI (US)

( * ) Notice: Subject to any disclaimer, the term of this patent is extended or adjusted under 35 U.S.C. 154(b) by 219 days.

(21) Appl. No.: 13/274,664

(22) Filed: Oct. 17, 2011

(65) Prior Publication Data

US 2013/0096827 A1    Apr. 18, 2013

(51) Int. Cl.
*G01C 21/34* (2006.01)

(52) U.S. Cl.
USPC ........... 701/533; 701/425; 701/446; 701/447; 340/991

(58) Field of Classification Search
USPC .......... 701/33.4, 36, 418, 421, 425, 446, 447, 701/533; 340/988, 991, 995.17, 426.16
See application file for complete search history.

(56) References Cited

U.S. PATENT DOCUMENTS

| 5,598,783 | A  | * | 2/1997 | Lund | 104/88.04 |
| 2004/0088392 | A1 | * | 5/2004 | Barrett et al. | 709/223 |

* cited by examiner

*Primary Examiner* — Gertrude Arthur Jeanglaude
(74) *Attorney, Agent, or Firm* — Cantor Colburn LLP

(57) ABSTRACT

Implementing a ride share service includes determining a route for an operator of the vehicle and accessing user preferences of the operator, the user preferences including characteristics of a ride share event and prospective ride share individuals. The ride share service also includes comparing the user preferences with information provided by individuals seeking transportation, each of the individuals providing a request for the transportation. The ride share service further includes identifying qualified candidates for the ride share event from the comparing by determining a threshold level of characteristics matching information provided by the individuals. In response to receiving a selection of a qualified candidate from the qualified candidates, the ride share service includes transmitting a communication to the selected qualified candidate accepting the request.

20 Claims, 4 Drawing Sheets

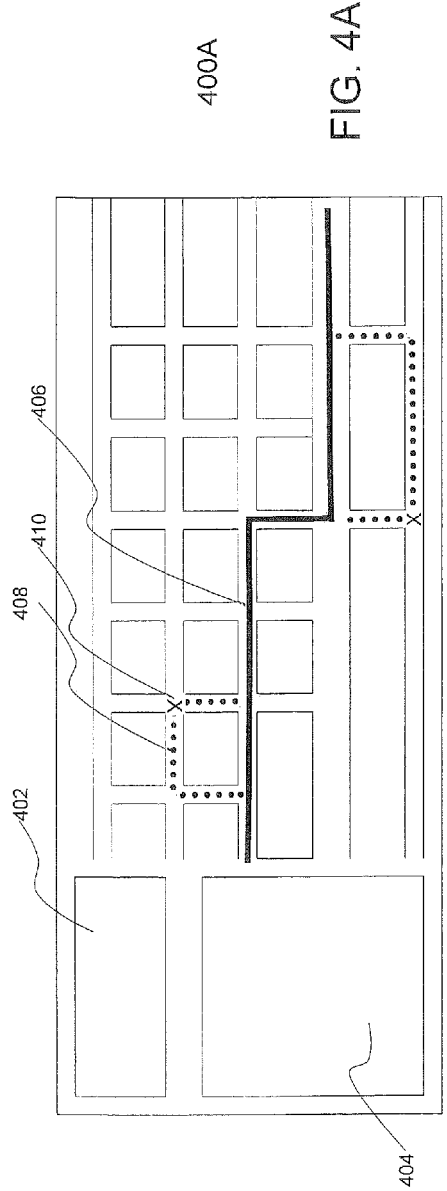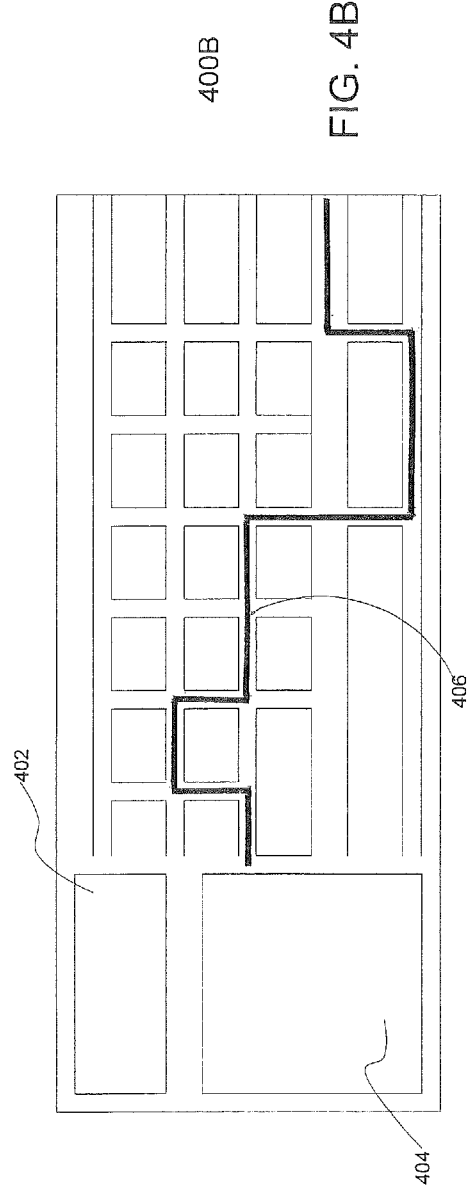

RIDE-SHARE SERVICE

FIELD OF THE INVENTION

The subject invention relates to communications and, more particularly, to ride-share services.

BACKGROUND

Many vehicles today come equipped with communications components that enable the vehicles to become aware of their location, e.g., through onboard navigation systems. Vehicle operators enter destination data into the navigation systems, and the navigation systems (through global positioning system components) are able to assist the operators in getting to their desired locations.

With the continued rise in energy costs, many vehicle operators are looking to find ways to minimize expenses incurred in their day-to-day travels. More energy-efficient vehicles are being designed and manufactured, and some individuals are relying more on public transportation to save money. One of the primary disadvantages in public transportation, however, is its lack of convenience in that public transport vehicles typically make several stops along a scheduled route, thereby extending the rider's commute time. Another disadvantage is that the commuter is limited to the scheduled pick-up/drop-off times scheduled by the transportation company.

Accordingly, it is desirable to provide a way to provide ride-share services that offer flexibility and convenience for all participants in the services.

SUMMARY OF THE INVENTION

In one exemplary embodiment of the invention, a system for implementing ride share services is provided. The system includes a computer processor disposed in a vehicle and logic executable by the computer processor. The logic is configured to implement a method. The method includes determining a route for an operator of the vehicle and accessing user preferences of the operator, the user preferences including characteristics of a ride share event and prospective ride share individuals. The method also includes comparing the user preferences with information provided by individuals seeking transportation, each of the individuals providing a request for the transportation. The method further includes identifying qualified candidates for the ride share event from the comparing by determining a threshold level of characteristics matching information provided by the individuals. In response to receiving, from the operator, a selection of a qualified candidate from the qualified candidates, the method includes transmitting a communication to the selected qualified candidate accepting the request.

In another exemplary embodiment of the invention, a method for implementing ride share services is provided. The method includes determining a route for an operator of the vehicle and accessing user preferences of the operator, the user preferences including characteristics of a ride share event and prospective ride share individuals. The method also includes comparing the user preferences with information provided by individuals seeking transportation, each of the individuals providing a request for the transportation. The method further includes identifying qualified candidates for the ride share event from the comparing by determining a threshold level of characteristics matching information provided by the individuals. In response to receiving, from the operator, a selection of a qualified candidate from the qualified candidates, the method includes transmitting a communication to the selected qualified candidate accepting the request.

In yet another exemplary embodiment of the invention, a computer program product for implementing a ride share service is provided. The computer program product includes a storage medium embodied with machine-readable program instructions, which when executed by a computer cause the computer to implement a method. The method includes determining a route for an operator of the vehicle and accessing user preferences of the operator, the user preferences including characteristics of a ride share event and prospective ride share individuals. The method also includes comparing the user preferences with information provided by individuals seeking transportation, each of the individuals providing a request for the transportation. The method further includes identifying qualified candidates for the ride share event from the comparing by determining a threshold level of characteristics matching information provided by the individuals. In response to receiving, from the operator, a selection of a qualified candidate from the qualified candidates, the method includes transmitting a communication to the selected qualified candidate accepting the request.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 4A depicts a navigation screen illustrating a driver's route and a prospective ride share passenger's route; and FIG. 4B depicts a navigation screen illustrating a driver's route updated to reflect a selected ride share candidate.

DESCRIPTION OF THE EMBODIMENTS

Figure 1:
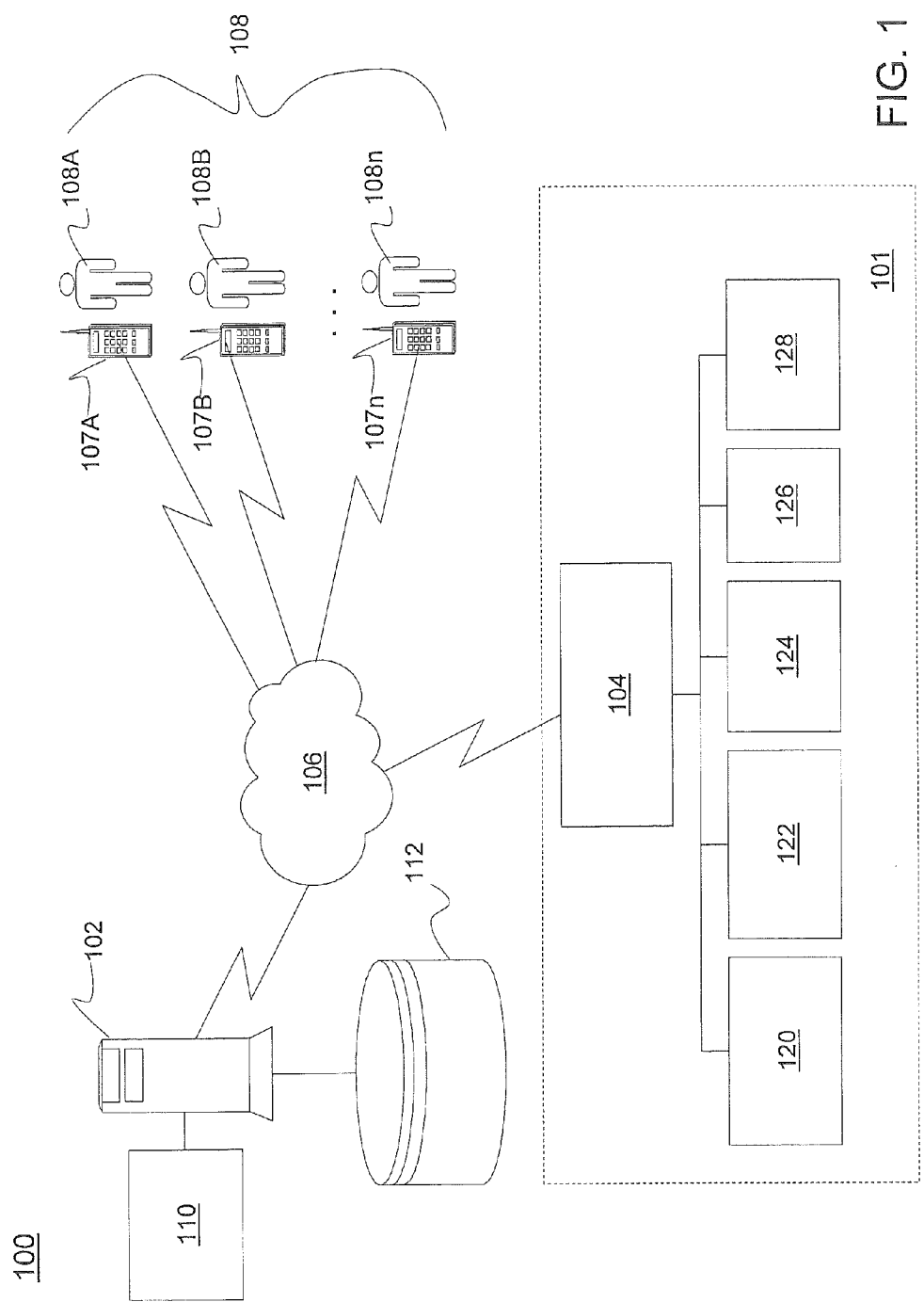
FIG. 1 is a block diagram of a system upon which ride share services may be implemented in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, ride share services are provided. The ride share services provide a means for subscribers of the services to share in carpooling activities (e.g., requesting a ride and offering a ride) through a flexible and convenient system. The ride share services further provide a means for a subscriber to pre-qualify candidates he/she wishes to participate in ride share events. The ride share services also minimize delays typically associated with coordinating schedules with ride sharing individuals through a dynamically updated user interface and user-configured settings.

Turning now to FIG. 1, a system 100 upon which ride share services may be implemented will now be described in an exemplary embodiment. The system 100 includes a portion of a vehicle 101 including components used in performing the ride share services. The vehicle 101 may be any type of automobile known in the art. As shown in FIG. 1, the system 100 also includes a host system 102 and communication devices 107A-107n of prospective riders 108A-108n, respectively. Each of the vehicle 101, host system 102, and communication devices 107A-107n are communicatively coupled to one another via one or more networks 106.

The host system 102 may be implemented as a high-speed computer processing device (e.g., a mainframe computer) capable of handling a high volume of activities conducted by the vehicle 101 and the communication devices 107 with regard to the host system 102. The host system 102 may be operated by an enterprise or organization implementing the exemplary ride sharing services described herein. The host system 102 may operate as a web server including a web site for generating accounts or subscriptions to the ride sharing services. The host system 102 may also operate as an application server including one or more applications for providing the ride sharing services described herein. These one or more applications are collectively referred to herein as ride share logic 110. In an embodiment, the host system 102 is communicatively coupled to a storage device 112, which stores accounts established for subscribers of the ride share services, as well as related data used to facilitate the ride services. Account records created via the ride share logic may include subscriber identification data (e.g., name, address, employer business name and address), billing account information, such as bank account data, and any other characteristics of the subscribers used in implementing the ride share services. These characteristics are described further herein. While the storage device 112 is shown in FIG. 1 as a separate physical device from the host system 102, it will be understood that the storage device 112 may be integrated into the host system 102 as internal storage (e.g., as a hard disk drive).

The communications devices 107A-107n may be any type of communications device capable of sending and receiving information over a network. For example, the communications devices 107A-107n may include one or more wireless communications devices (e.g., cellular telephone, smart phone, personal digital assistant) and wireline communications device (e.g., a general desktop computer or laptop) or may be a communication system as described further herein with respect to the vehicle 101. The prospective riders 108A-108n refer to subscribers of the ride share services who are seeking to participate in a ride share event. A ride share event refers to a carpooling activity in which a prospective rider has been accepted or approved for sharing a ride with another subscriber, or a subscriber who is currently sharing a ride with another subscriber. The prospective riders may be engaged in seeking a ride share event via a corresponding communications device or have been approved and are waiting at a pick up location for a ride share event. The communications devices 107A-107n may be configured to send and receive communications either directly with a subscriber who is offering a ride share event or through the host system 102, which conveys the ride share event information to the subscriber offering the ride share event. The communications between subscribers may be conveyed by any means desired, such as text, instant message, voice, etc.

The networks 106 may be any type of known networks in the art. For example, the networks 106 may be a combination of public (e.g., Internet), private (e.g., local area network, wide area network, virtual private network), and may include wireless and wireline transmission systems (e.g., satellite, cellular network, terrestrial networks, etc.).

The vehicle 101 includes a communication system 104, which in turn comprises input/output (I/O) components 120, a computer processor 122, logic 124, a global positioning system (GPS) 126, and a storage device 128, each of which may be in communication with one another via a communications bus (not shown). The input components of the I/O components 120 may include input controls (e.g., keypad) or may be implemented by voice recognition technology and voice commands. The output components of the I/O components 120 may include a display screen or monitor, or may be an audio system that presents audio messages or alerts to occupants of the vehicle 101. The computer processor 122 executes the logic 124, which in turn is configured to receive inputs via the I/O components 120 in assisting a user to establish operator settings and processes the inputs to create a file for the operator, as will be described further herein. The file may be stored in the storage device 128 and/or the storage device 112 via transmission over the networks 106 and may be accessed by the logic 124 and/or the ride share logic 110 as needed.

The GPS 126 may be implemented by a navigation system. In an exemplary embodiment, the storage device 128 is in communication (e.g., via the communications bus) with the GPS 126 whereby the GPS 126 stores commonly used routes in the storage device 128. The communication system 104 (e.g., via the logic 124) may be configured to use the stored routes in implementing the exemplary ride share services described herein. In one embodiment, the vehicle 101 may include a road side assistance service, such as OnStar™ which may be communicatively coupled to the communication system 104 in facilitating the communications described with respect to the ride share services.

While the exemplary ride share services are described herein with respect to a communication system 104, which is described as an onboard vehicle system, it will be understood that other implementations may be configured to realize the advantages of the invention. For example, a portion of the functionality performed by the communication system 104 may be implemented using a wireless communications device, e.g., a smart phone and corresponding logic 124, that is communicatively coupled in a wireless fashion to components of the communication system 104 via a short-range communications network (e.g., via BlueTooth™).

In an embodiment, ride share participants (i.e., drivers and passengers) may configure ride sharing preferences through a user interface provided by the ride share logic 110 over networks 106 or via logic 124 and I/O components 120 (e.g., where the logic 124 is downloaded to the communication system 104 or wireless communication device, such as communications devices 107A-107n). The operator may identify himself to the communication system 104 or host system 102 using, e.g., key fob identification information provided by a key fob when engaged in the vehicle ignition system. Alternatively, the operator may identify himself through a user-selected personal identification number created by the operator and entered into the system. In yet a further embodiment, the operator may identify himself via a cell phone communication between the operator's cell phone and the communication system 104 (e.g., through a short-range communications antenna) and/or the host system 102 via the networks 106. The operator or passenger may be identified by the cell phone number assigned to the cell phone.

The logic 124 monitors the vehicle 101 operation over time and stores the operator's driving history in the storage device 128. The driving history may include routes taken by the operator and may associate time-based data with the routes, such as the time of day the route is taken, the day of week the route is taken, etc. Thus, when the operator enters the vehicle 101, the logic 124 may determine an estimated route before the operator engages the vehicle in drive. Alternatively, the logic 124 may use other information, such as GPS data indicative of a direction in which the operator is currently headed in conjunction with the stored driving history in order to ascertain the route/destination of the operator.

In an embodiment, the operator may enter user preferences via the I/O components (or other communications device, such as a smart phone that executes the logic 124). The user preferences may include any characteristics desired by the operator in identifying and selecting candidates (also referred to as "participants") for ride share events. Non-limiting characteristics of prospective riders may include, e.g., employer, current location of prospective rider, desired destination, participant rating, social group of participant or a number of common friends of participant in social group, amount of ride bid, etc. By selecting one of more of these characteristics, the operator may increase the level of safety or security of the ride share event by selecting only those participants having some clear association with the operator. A participant rating system may be configured by the ride share services in order to ensure a positive ride share experience for all occupants of a vehicle participating in a ride share event. The participant rating system may enable participants of a ride share event to rate the ride share experience with respect to each of the participants. For example, a participant who is late in arriving at an agreed pick up location may be rated poorly as compared to a participant who arrives in a timely manner.

Figure 2:
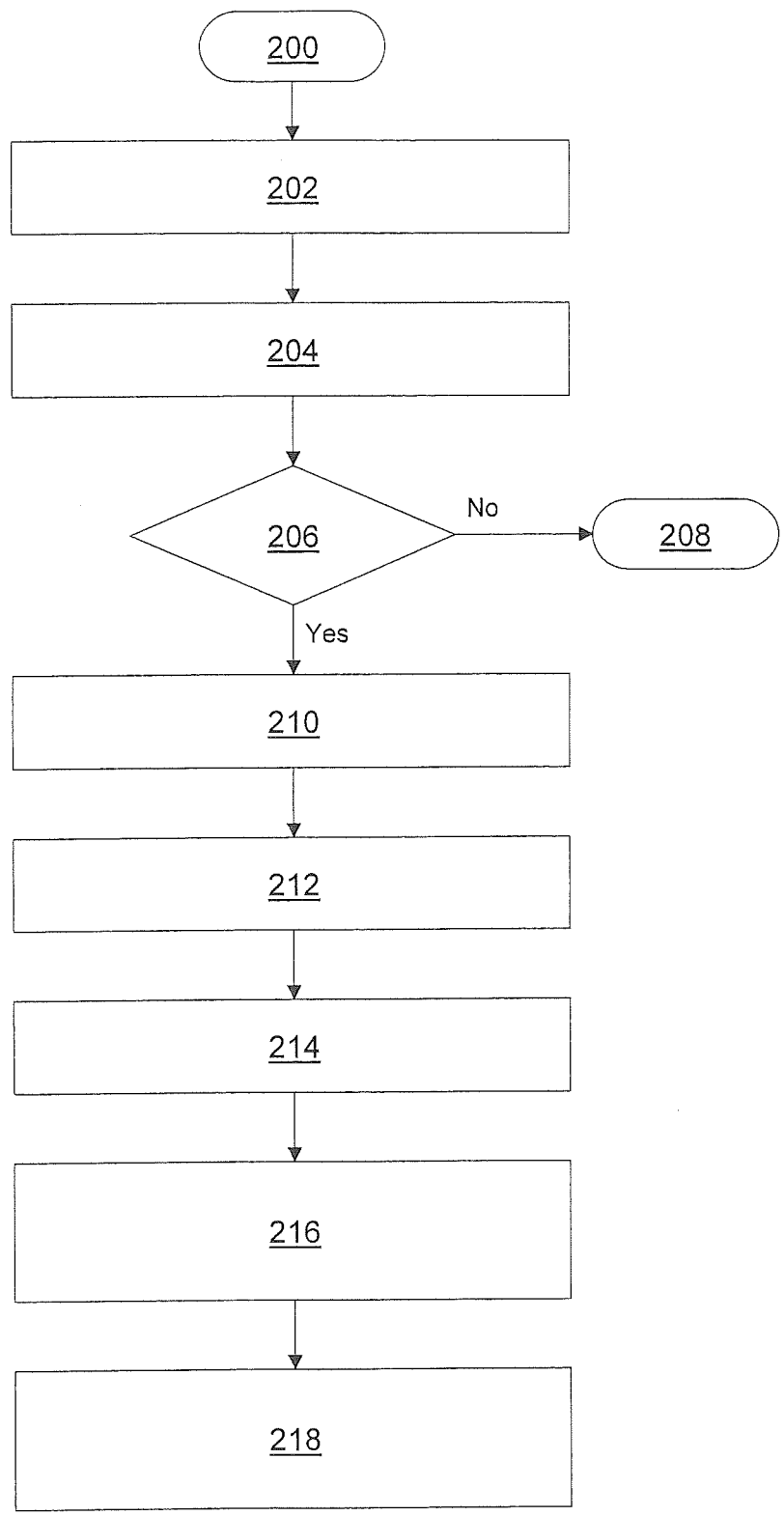
FIG. 2 is a flow diagram describing a process for implementing the ride share services in accordance with an embodiment.

Once the user has entered the preferences, ride share offers are ready to be implemented. Turning now to FIG. 2, a process for implementing the ride share services will now be described in an exemplary embodiment. The processes described in FIG. 2 assume that a user is a subscriber of the ride share services and has entered a vehicle (e.g., vehicle 101). At least a portion of the processes described in FIG. 2 may also apply to a subscriber who is seeking a ride through the ride share services. Further, the ride share processes described in FIG. 2 are implemented primarily through the logic 110 executing on the host system 102. However, it will be understood that at least a portion of the processes may be implemented via the logic 124 executing on the computer processor 122 of the communication system 104.

The process begins at step 200 whereby the logic 110 identifies the operator/user of the vehicle 101. At step 202, the logic 110 determines the user's route (e.g., via direct input to a navigation system, via driving history data stored in the storage device 128, and/or by the current direction in which the vehicle is headed).

At step 204, the logic 110 prompts the user to initiate a ride share event (e.g., inviting at least one other subscriber to share a ride or requesting a ride from another subscriber at a desired meeting location—e.g., where the user does not wish to drive the vehicle 101 to the final destination). In turn, the other subscriber has made known (e.g., by a request) a desire to participate in a ride share event via the ride share services. The prompt may be presented on the communication system 104 via a display device (e.g., I/O components 120) or via the user's wireless communication device over a Bluetooth™ connection.

At step 206, it is determined whether the user has accepted the offer. For example, the user may select an option via the communication system 104 or via the wireless communication device to accept or reject the offer. If the user has rejected the offer, the process ends at step 208.

However, if the user has accepted the offer at step 206, the logic 110 accesses the user's preferences from storage at step 210. The logic 110 compares the preferences to information received from prospective riders 108A-108n via, e.g., respective communications devices 107A-107n. The information received from prospective riders 108A-108n may include identifying information, such as the name, physical address, and communication address (e.g., email, telephone number, cellphone or smartphone number, etc.) of each of the prospective riders 108A-108n. The information may also include a current location of the prospective rider, a desired destination of the prospective rider, a social group and/or friend list associated with the prospective rider, and an employer of the prospective rider. In addition, the information received from the prospective riders 108A-108n may include a bid amount that specifies an amount of money that the prospective rider is willing to contribute to the ride share event. The information may also include an indicator of whether the prospective rider desires to ride as an occupant of a vehicle or act as driver with respect to the ride share event. Transactions regarding the bids may be implemented through the host system 102 using banking account information stored in the subscribers account records or may be handled through a third party service provider.

At step 212, the logic 110 identifies qualified candidates using the results of the comparisons described above. In particular, the logic 110 may be configured to identify a threshold level of characteristics in the preferences that match corresponding information provided by the prospective riders 107A-107n in determining which of the prospective riders 108A-108n are qualified candidates. In addition, the logic 110 utilizes the destination information of the operator in conjunction with the current date and time in making these determinations. For example, a prospective rider 108A provides information (e.g., via communication device 107A) to the host system 102 that includes the name, a pick up location, destination location, employer and bid amount. The information may also include a time of desired pick up. Alternatively, the logic 110 may be configured to ascertain that the current time or within a reasonable period associated with the current time is the desired time of pick up (i.e., the request is for an immediate pick up or within minutes of the current time). The logic 110 compares this information with the preferences of the operator, which preferences include the employer and the destination of the prospective rider 108A. The logic 110 further evaluates the current time, the routing information in the driving history of the operator, and the pick up location of the prospective rider 108A to determine whether it is feasible for the operator to pick up the prospective rider 108A without negatively impacting the operator's commute. For example, if the commuting distance to the pick up location would significantly impact the time in which the operator would get to his destination, the logic 110 may determine that this prospective rider 108A is not a suitable candidate.

Figure 3:
FIG. 3 is a user interface screen with sample ride share data in accordance with an embodiment.

At step 214, the logic 110 displays a list of candidates, along with supporting information to the operator. A user interface screen 300 with sample candidates and supporting information is shown in FIG. 3. As provided in the user interface screen 300, a field 302 provides pick up information for each of the qualified candidates, a field 304 provides the name of each of the qualified candidates, and a field 306 provides background information for each of the qualified candidates. The background information may include the number of ratings issued for the prospective candidate as well as a percentage of positive ratings for the prospective candidate. Also, as provided in the user interface screen 300, a field 308 provides a desired destination of each of the qualified candidates, a field 310 provides a ride indicator associated with the qualified candidates, and a field 312 provides a current bid offered by the qualified candidates. The ride indicator field 310 specifies whether the qualified candidate desires a ride to the destination or whether the qualified candidate wishes to drive. Further, as provided in the user interface screen 300, a field 314 specifies a proximity of time to the pick up location, a field 316 specifies a pick up delay time, if applicable, and a field 318 specifies an action to be taken. The proximity of time to the pick up location field 314 informs the operator an amount of time that is estimated before the operator will reach the pick up location.

The pick up delay field 316 specifies the total amount of added time delay in reaching the operator's final destination due to ride share pick ups. For example, a pick up location (in field 302) may be 10 minutes away from the operator and on the operator's planned route. Alternatively, the pick up location (in field 302) could be 10 minutes away from the operator, which includes a 2 minute detour from the operator's route. In addition, the passenger's destination (from field 308) could be X number of highway exits before the operator's planned exit and then an additional 1 mile from the highway. The operator would drive an additional 4 minutes plus 2 miles out of his/her planned route to pick up and drop off the rider and return to his/her original planned route. Field 316 would indicate what the time equivalent is to drive 4 minutes plus 2 miles. Providing this information enables the operator to gauge the extent of detour in view of his/her notion of what is considered an acceptable detour, thereby facilitating the operator's decision whether to filter out prospective passengers from the ride share event.

The action to be taken in field 318 prompts the operator to initiate a communication with a qualified candidate. The operator may wish to communicate with the qualified candidate to accept the request by the candidate for the ride share event, to update an approved candidate with respect to estimated time of arrival at the pick up location, and/or to inform the approved candidate of the arrival of the operator. If the operator selects the option in field 318 to contact the candidate, the ride share services may be configured to initiate a communication, e.g., via the communication system 104 or wireless communication device, by autonomously inputting contact information for the candidate into the communication system 104.

The ride share services may also be configured to display a variation of the data shown in FIG. 3 via the display. The operator may configure the ride share services, e.g., via the logic 124 to display an abbreviated version of the data shown in the user interface 300. As time passes, the logic 110 updates the user interface 300 to reflect either new prospective candidates who have more recently requested to participate in a ride share event, or completed pick ups with respect to the ride share event.

In an exemplary embodiment, the logic 110 and/or logic 124 may be configured to populate the operator's route, via a navigation screen in the vehicle 101, with the one or more routes of qualified candidates. In FIG. 4A, a navigation screen 400A includes a panel 402 that provides a starting point and destination for the operator's route, and a panel 404 that lists the candidates. The operator's route is shown as a solid line 406 and is overlaid by a detour to a qualified passenger's 410 pick up and drop location, which is shown as a dotted line 408 within the navigation screen 400A. It will be understood that any means of distinguishing among the routes may be used, such as a color scheme differentiating the operator's route from the qualified passenger detour.

At step 216, the operator selects one or more of the qualified candidates from the list (e.g., the list of candidates in the user interface screen 300) via the I/O components 120 or via the wireless communications device. At step 218, the ride share logic 110 or the logic 124 initiates a communication with the selected candidate(s) as described above. The communication may be a text message, voice message, or other communication.

In an embodiment, the logic 110 may be configured to update the driver's route on the navigation screen to reflect the detour needed in order to accommodate the selected candidate. A navigation screen 400B illustrates the route of FIG. 4A updated to include the ride share passenger. In addition, the panel 402 is updated with the new route, and the panel 404 is updated to reflect the selected passenger.

Technical effects of the invention include providing a means for subscribers of the services to share in carpooling activities (e.g., requesting a ride and offering a ride) through a flexible and convenient system. The system includes an onboard vehicle communication system that interacts with a host system which provides the services. The ride share services further provide a means for a subscriber to pre-qualify candidates he/she wishes to participate in ride share events through a user interface. The ride share services also minimize delays typically associated with coordinating schedules with ride sharing individuals through a dynamically updated user interface and user-configured settings.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system for implementing ride share services, comprising:
   a computer processor disposed in a vehicle; and
   logic executable by the computer processor, the logic configured to implement a method, the method comprising:
     determining a route for an operator of the vehicle;
     accessing user preferences of the operator, the user preferences including characteristics of a ride share event and prospective ride share individuals;

comparing the user preferences with information provided by individuals seeking transportation, each of the individuals providing a request for the transportation;

identifying qualified candidates for the ride share event from the comparing by determining a threshold level of characteristics matching information provided by the individuals; and in response to receiving, from the operator, a selection of a qualified candidate from the qualified candidates, transmitting a communication to the selected qualified candidate accepting the request.

2. The system of claim 1, wherein the logic is further configured to implement:

monitoring driving activities performed by the operator; and storing the driving activities in a storage device, the driving activities including destinations travelled, routes taken, and time and dates of the routes;

wherein determining the route comprises accessing the driving activities stored in the storage device, comparing the time and dates of the routes to a current time and date, and estimating a planned destination for the operator responsive to the comparing.

3. The system of claim 1, wherein the logic is further configured to implement:

monitoring driving activities performed by the operator; and storing routes taken by the operator in a storage device in response to the monitoring;

wherein determining the route comprises comparing a current direction traveled by the operator with the routes stored in the storage device, and estimating a planned destination for the operator responsive to the comparing.

4. The system of claim 1, wherein the characteristics of a ride share event and prospective ride share individuals include at least one of:

an employer;

a destination location;

a participant rating of each of the prospective ride share individuals;

a pick up location of each of the ride share individuals;

a social group associated with each of the prospective ride share individuals; and a bid value associated with each of the prospective ride share individuals.

5. The system of claim 1, wherein the information provided by individuals seeking transportation includes at least one of:

a destination location;

a pick up location;

a bid value offered for the ride share event;

contact information for each of the individuals; and data identifying each of the individuals.

6. The system of claim 1, wherein the information provided by individuals seeking transportation includes an indicator specifying one of:

a desire to receive a ride from the operator of the vehicle; and a desire to act as a driver with regard to the ride share event.

7. The system of claim 1, wherein the logic is further configured to implement:

presenting a list of the qualified candidates to the operator via an onboard navigation system display in the vehicle;

wherein receiving the selection is implemented by an option on the onboard navigation system display in the vehicle.

8. A method for implementing ride share services, comprising:

determining a route for an operator of a vehicle;

accessing user preferences of the operator, the user preferences including characteristics of a ride share event and prospective ride share individuals;

comparing the user preferences with information provided by individuals seeking transportation, each of the individuals providing a request for the transportation;

identifying qualified candidates for the ride share event from the comparing by determining a threshold level of characteristics matching information provided by the individuals; and in response to receiving, from the operator, a selection of a qualified candidate from the qualified candidates, transmitting a communication to the selected qualified candidate accepting the request.

9. The method of claim 8, further comprising:

monitoring driving activities performed by the operator; and storing the driving activities in a storage device, the driving activities including destinations travelled, routes taken, and time and dates of the routes;

wherein determining the route comprises accessing the driving activities stored in the storage device, comparing the time and dates of the routes to a current time and date, and estimating a planned destination for the operator responsive to the comparing.

10. The method of claim 8, further comprising:

monitoring driving activities performed by the operator; and storing routes taken by the operator in a storage device in response to the monitoring;

wherein determining the route comprises comparing a current direction traveled by the operator with the routes stored in the storage device, and estimating a planned destination for the operator responsive to the comparing.

11. The method of claim 8, wherein the characteristics of a ride share event and prospective ride share individuals include at least one of:

an employer;

a destination location;

a participant rating of each of the prospective ride share individuals;

a pick up location of each of the ride share individuals;

a social group associated with each of the prospective ride share individuals; and a bid value associated with each of the prospective ride share individuals.

12. The method of claim 8, wherein the information provided by individuals seeking transportation includes at least one of:

a destination location;

a pick up location;

a bid value offered for the ride share event;

contact information for each of the individuals; and data identifying each of the individuals.

13. The method of claim 8, wherein the information provided by individuals seeking transportation includes an indicator specifying one of:

a desire to receive a ride from the operator of the vehicle; and a desire to act as a driver with regard to the ride share event.

14. The method of claim 8, further comprising:

presenting a list of the qualified candidates to the operator via an onboard navigation system display in the vehicle;

wherein receiving the selection is implemented by an option on the onboard navigation system display in the vehicle.

15. A computer program product for implementing ride share services, the computer program product comprising a storage medium embodied with computer-readable program instructions, which when executed by a computer, cause the computer to implement a method, the method comprising:

determining a route for an operator of a vehicle;

accessing user preferences of the operator, the user preferences including characteristics of a ride share event and prospective ride share individuals;

comparing the user preferences with information provided by individuals seeking transportation, each of the individuals providing a request for the transportation;

identifying qualified candidates for the ride share event from the comparing by determining a threshold level of characteristics matching information provided by the individuals; and in response to receiving, from the operator, a selection of a qualified candidate from the qualified candidates, transmitting a communication to the selected qualified candidate accepting the request.

16. The computer program product of claim 15, wherein the program instructions further implement:

monitoring driving activities performed by the operator; and storing the driving activities in a storage device, the driving activities including destinations travelled, routes taken, and time and dates of the routes;

wherein determining the route comprises accessing the driving activities stored in the storage device, comparing the time and dates of the routes to a current time and date, and estimating a planned destination for the operator responsive to the comparing.

17. The computer program product of claim 15, wherein the program instructions further implement:

monitoring driving activities performed by the operator; and storing routes taken by the operator in a storage device in response to the monitoring;

wherein determining the route comprises comparing a current direction traveled by the operator with the routes stored in the storage device, and estimating a planned destination for the operator responsive to the comparing.

18. The computer program product of claim 15, wherein the characteristics of a ride share event and prospective ride share individuals include at least one of:

an employer;
a destination location;
a participant rating of each of the prospective ride share individuals;
a pick up location of each of the ride share individuals;
a social group associated with each of the prospective ride share individuals; and
a bid value associated with each of the prospective ride share individuals.

19. The computer program product of claim 15, wherein the information provided by individuals seeking transportation includes at least one of:

a destination location;
a pick up location;
a bid value offered for the ride share event;
contact information for each of the individuals; and
data identifying each of the individuals.

20. The computer program product of claim 15, wherein the information provided by individuals seeking transportation includes an indicator specifying one of:

a desire to receive a ride from the operator of the vehicle; and
a desire to act as a driver with regard to the ride share event.

* * * * *